(12) United States Patent
Kwak et al.

(10) Patent No.: US 12,728,926 B2
(45) Date of Patent: Sep. 8, 2026

(54) MOUNTING UNIT FOR UPPER MODULE OF VEHICLE

(71) Applicants: Hyundai Motor Company, Seoul (KR); Kia Corporation, Seoul (KR)

(72) Inventors: Dong-Hyuk Kwak, Hwaseong-si (KR); Jae-Wook Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 391 days.

(21) Appl. No.: 18/490,080

(22) Filed: Oct. 19, 2023

(65) Prior Publication Data

US 2025/0010919 A1 Jan. 9, 2025

(30) Foreign Application Priority Data

Jul. 5, 2023 (KR) ........................ 10-2023-0087150

(51) Int. Cl.
*B62D 24/02* (2006.01)

(52) U.S. Cl.
CPC .................................... *B62D 24/02* (2013.01)

(58) Field of Classification Search
CPC ... F16B 5/0266; B62D 33/077; B62D 27/065; B62D 27/06; B62D 24/02; B60Y 2304/07
See application file for complete search history.

(56) References Cited

U.S. PATENT DOCUMENTS 3,521,845 A * 7/1970 Sweda .................... B60P 7/132 410/83
3,643,906 A * 2/1972 Werner ................... B60P 7/132 410/83
3,717,372 A * 2/1973 Carr ........................ B60P 7/132 410/82
3,768,857 A * 10/1973 Horton .................... B60P 7/132 410/83
3,825,294 A * 7/1974 Carr ........................ B60P 7/132 410/82
4,026,596 A * 5/1977 Carr ........................ B60P 7/132 410/82
4,321,000 A * 3/1982 Novak .................... B60P 7/132 410/82
4,437,211 A * 3/1984 Dorpmund ......... B65D 90/0013 410/82
9,937,997 B2 * 4/2018 Himmelmann ........... B64C 1/20
10,486,583 B2 * 11/2019 Jo .......................... B65D 90/00

FOREIGN PATENT DOCUMENTS

KR 20140013636 A 2/2014

* cited by examiner

*Primary Examiner* — Lori Lyjak
(74) *Attorney, Agent, or Firm* — Slater Matsil, LLP

(57) ABSTRACT

An embodiment mounting device for an upper module of a vehicle includes a base mounted on an under body of the vehicle, a main rod rotatably disposed on the base and having a head configured to pass through a mounting bracket mounted on the upper module of the vehicle or to be caught and fixed by the mounting bracket according to a rotation of the main rod, and an operating lever having an end portion coupled to the main rod, the operating lever being configured to rotate the main rod to couple or separate the head to or from the mounting bracket.

20 Claims, 10 Drawing Sheets

<unlock>

<lock>

MOUNTING UNIT FOR UPPER MODULE OF VEHICLE

CROSS-REFERENCE TO RELATED APPLICATIONS

This application claims the benefit of Korean Patent Application No. 10-2023-0087150, filed on Jul. 5, 2023, which application is hereby incorporated herein by reference.

TECHNICAL FIELD

Exemplary embodiments of the present disclosure relate to a mounting unit for an upper module of a vehicle.

BACKGROUND

As illustrated in FIG. 1, a multi-purpose vehicle (hereinafter, referred to as a "vehicle") including a truck may be used for various purposes by replacing and mounting an upper module 111 to an under body 112 of the vehicle instead of a loading bay.

The upper module 111 may be an oil tank, a camping module, or a box-type loading bay. For example, an oil tank is mounted on the under body 112 and the vehicle may be used as a tank lorry, or a camping module is mounted on the under body 112 and the vehicle may be used as a camper van. Alternatively, when a box-type loading bay is applied to the upper module 111, an empty loading bay is separated from the under body 112 of the vehicle, cargo is pre-loaded inside the loading bay, and the loading bay loaded with the cargo is mounted on the under body 112 of the vehicle so that it is possible to reduce a time required for loading cargo in the area of cargo logistics such as home delivery service.

To mount the upper module 111, mounting brackets 121 and 122 are provided on the upper module 111 and the under body 112, respectively, and the mounting brackets 121 and 122 are fastened to the under body 112 at a plurality of points using a fastening bolt 131 and a fastening nut 132 so that the upper module 111 is mounted on the under body 112.

However, when the upper module 111 is mounted using the fastening bolt 131 and the fastening nut 132, attachment and detachment work of the upper module 111 is not easy. When a new upper module 111 is mounted, the fastening bolt 131 and the fastening nut 132 are released, a previously mounted loading bay is detached, a position of the new upper module 111 is adjusted, and the fastening bolt 131 and the fastening nut 132 are fastened again to mount the upper module 111 on the under body 112.

However, since the release and reconnection of the fastening bolt 131 and the fastening nut 132 are repeated at a plurality of points, a lot of time is required and aligning a position of the new upper module 111 is not easy when the new upper module 111 is mounted.

SUMMARY

Exemplary embodiments of the present disclosure relate to a mounting unit for an upper module of a vehicle. Particular embodiments relate to a mounting unit for an upper module of a vehicle that easily mounts an upper module to an under body by operating a lever without performing bolting work.

An embodiment of the present disclosure provides a mounting unit for an upper module of a vehicle configured to mount an upper module on an under body through a simple lever operation without using a fastening bolt and a fastening nut.

Other objects and advantages of embodiments of the present disclosure may be understood by the following description and become apparent with reference to the embodiments of the present disclosure. Also, it is obvious to those skilled in the art to which the present disclosure pertains that the objects and advantages of embodiments of the present disclosure may be realized by the means as claimed and combinations thereof.

In accordance with an embodiment of the present disclosure, there is provided a mounting unit for an upper module, which includes a base mounted on an under body of a vehicle, a main rod rotatably provided on the base and having a head which passes through a mounting bracket mounted on an upper module of the vehicle and is caught and fixed by the mounting bracket according to a rotation of the main rod, and an operating lever with an end portion coupled to the main rod and configured to rotate the main rod to couple or separate the head to or from the mounting bracket.

When the head is coupled to the mounting bracket, the operating lever may move the main rod down at a predetermined height.

A plate, on which protrusions are formed at regular intervals to protrude downward at predetermined heights along a circumference, may be coupled to a bottom surface of the base, and a fastening protrusion may be formed at the operating lever, wherein the fastening protrusion is caught on the protrusion to move the main rod down when the head is coupled to the mounting bracket.

The operating lever may include fastening portions, each having a fastening hole through which the main rod passes, and coupled to the main rod, and a lever vertically extending from an outer surface of the fastening portion, and the fastening protrusions may be formed at intervals along a circumference of an upper surface of the fastening portion.

A first coupling surface formed as a flat surface may be formed at a lower portion of the main rod, a portion of the fastening hole of the operating lever may be formed as a second coupling surface to correspond to the first coupling surface, and a cap nut configured to fasten the operating lever to the main rod may be screw-coupled to a lower end of the main rod.

An upper flange and a lower flange may be formed to extend from an upper end portion and a lower end portion of the base parallel to the ground, respectively, and the main rod may be provided to pass through the upper flange and the lower flange.

The plate may be provided on a bottom surface of the lower flange.

A fixing hole may be formed in the form of an elongated hole in the mounting bracket, the head may be formed at an upper end portion of the main rod to have a cross section corresponding to the fixing hole, and the head may pass through or may be caught on the fixing hole according to a rotation of the main rod so that the upper module may be unlocked or locked with respect to the under body.

The mounting unit may further include a damper provided by being inserted into the main rod and inserted and fixed between the main rod and the fixing hole while spread outward when the main rod is rotated.

Extensions extending outward may be formed on the damper at predetermined intervals, a cam protruding outward in a circumferential direction of the main rod may be formed on the main rod, and when the main rod is rotated, the cam may press the extensions outward so that the extensions may be inserted and fixed between the main rod and the fixing hole.

The extensions and the cam may be formed at an interval of 180 degrees on the damper and the main rod, respectively, and when the head and the fixing hole are aligned in different directions, the cam may press the extensions so that the extensions may spread outward.

The main rod may be provided with a spring configured to elastically support the main rod and the damper in an upward direction.

DETAILED DESCRIPTION OF ILLUSTRATIVE EMBODIMENTS

Figure 1:
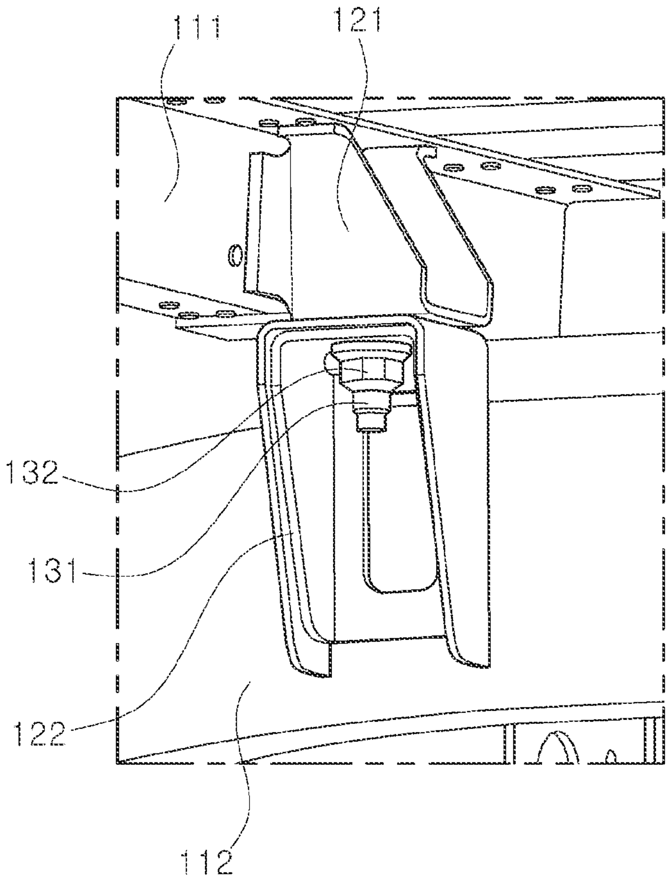
FIG. 1 is a perspective view illustrating a state in which an upper module of a vehicle is mounted according to the related art.
Figure 2:
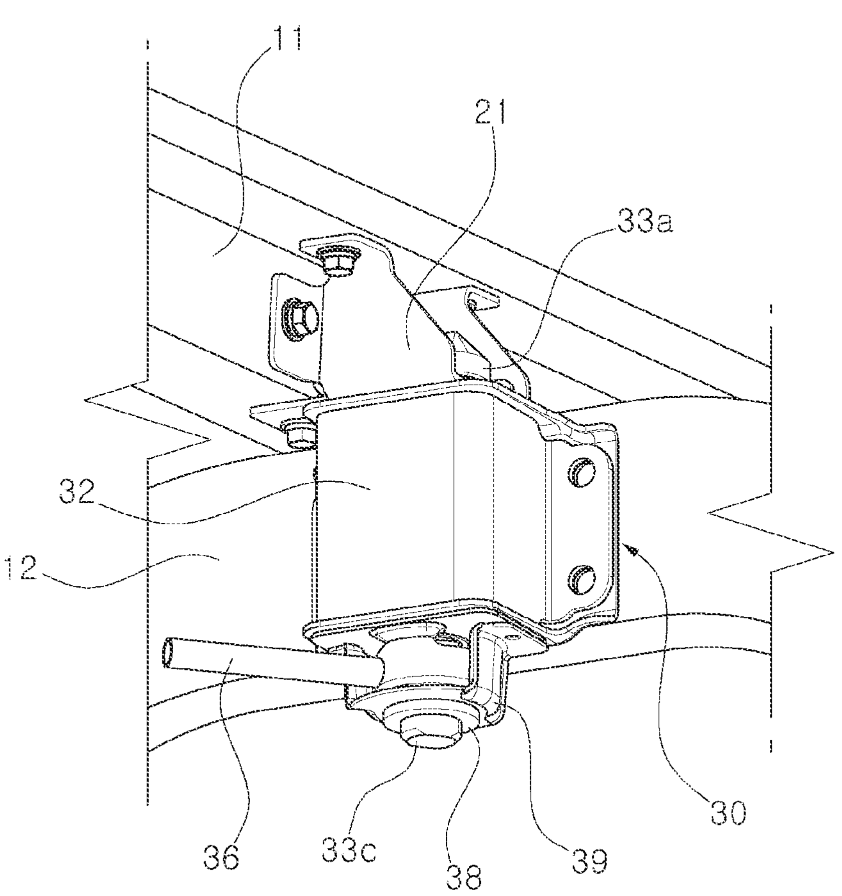
FIG. 2 is a perspective view illustrating a state in which the upper module is mounted on an under body using a mounting unit for the upper module of a vehicle according to embodiments of the present disclosure.
Figure 3:
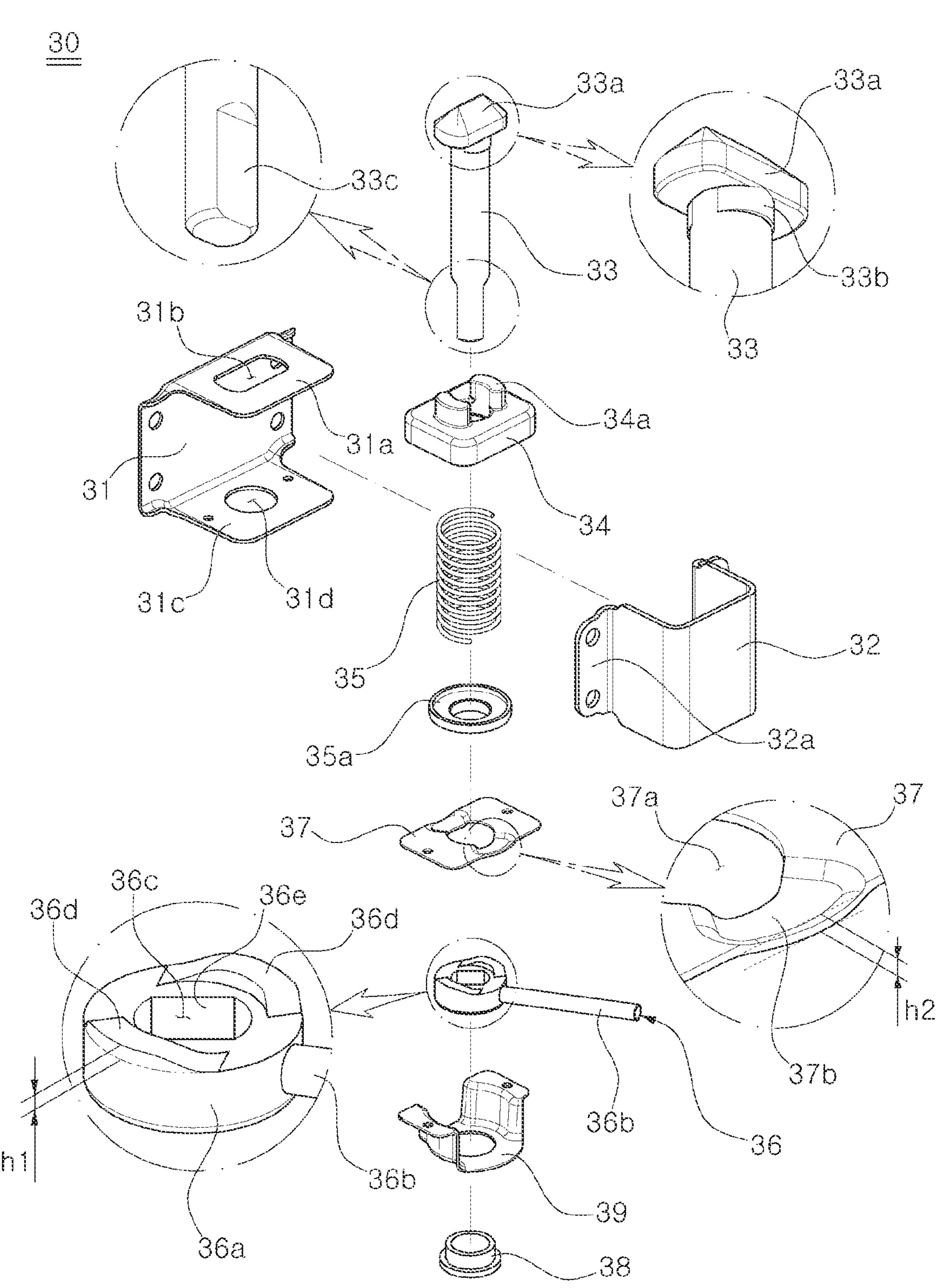
FIG. 3 is an exploded perspective view illustrating the mounting unit for the upper module of a vehicle according to embodiments of the present disclosure.

Hereinafter, a mounting unit for an upper module of a vehicle according to embodiments of the present disclosure will be described in detail with reference to the accompanying drawings.

A mounting unit 30 for an upper module of a vehicle according to embodiments of the present disclosure may include a base 31 mounted on an under body 12 of the vehicle, a main rod 33 rotatably provided on the base 31 and having a head 33*a* which may pass through a mounting bracket 21 mounted on an upper module 11 of the vehicle and may be caught and fixed to the mounting bracket 21 according to a rotation, and an operating lever 36 having an end portion coupled to the main rod 33 and configured to rotate the main rod 33 to fix the head 33*a* to the mounting bracket 21.

The base 31 may be fastened to the under body 12 of the vehicle. The base 31 may include an upper flange 31*a* and a lower flange 31*c* which are formed to extend from an upper end portion and a lower end portion in a direction parallel to the ground. A mounting hole 31*b* and a through-hole 31*d*, through which the main rod 33 passes, may be formed in the upper flange 31*a* and the lower flange 31*c*, respectively. The mounting hole 31*b* may be formed in the form of an elongated hole.

A cover 32 may be fastened to an outer side of the base 31. The cover 32 may be formed in a bent shape to form a space for accommodating the main rod 33, and both end portions of the cover 32 are fastened to the base 31 through bolts (not shown).

The main rod 33 may be rotatably provided in the base 31. According to a rotation of the main rod 33, the main rod 33 may lock or unlock the mounting bracket 21 formed on the upper module 11. In a state in which the main rod 33 unlocks the mounting bracket 21, a previously mounted upper module 11 may be separated and a new upper module 11 may be mounted. In a state in which the main rod 33 locks the mounting bracket 21, the newly mounted upper module 11 may be maintained in a state of being firmly mounted on the vehicle.

The head 33*a* may be formed on top of the main rod 33. According to the rotation of the main rod 33, the head 33*a* may pass through or may be caught in a fixing hole 21*a* formed in the mounting bracket 21. The fixing hole 21*a* may be formed in the form of an elongated hole and a cross section of the head 33*a* may be formed in a shape corresponding to the fixing hole 21*a*. Thus, according to an arrangement state of the head 33*a* and the fixing hole 21*a*, the upper module 11 may be locked or unlocked with respect to the under body 12.

That is, when the head 33*a* is aligned in the same direction as a direction in which a length of the fixing hole 21*a* is long, the upper module 11 may be in an unlocked state with respect to the under body 12, and when the head 33*a* and the fixing hole 21*a* are aligned in different directions, the upper module 11 may be in a locked state with respect to the under body 12.

The head 33*a* may be formed to have a cross-sectional area, which becomes narrower from the bottom to the top, to be easily inserted into the fixing hole 21*a*. In addition, the cross-sectional area of the head 33*a* may be formed to be slightly smaller than a cross-sectional area of the fixing hole 21*a*.

The operating lever 36 may be fastened to a lower end portion of the main rod 33.

The operating lever 36 may include a fastening portion 36*a* coupled to the main rod 33 and a lever 36*b* extending from the fastening portion 36*a* and held and operated by a user.

The fastening portion 36*a* may be formed in a ring shape in which a fastening hole 36*c* is formed, the lower end portion of the main rod 33 may be inserted into the fastening hole 36*c*, and thus the main rod 33 and the operating lever 36 may be coupled.

In particular, when the operating lever 36 is rotated, a portion of a circumference of the lower end portion of the main rod 33 may be cut to form a flat first coupling surface 33*c* so as to prevent occurrence of slip between the operating lever 36 and the main rod 33, and in correspondence to the flat first coupling surface 33*c*, a portion of the fastening hole 36*c* may be formed as a flat second coupling surface 36*e*. Since the lower end portion of the main rod 33 and the fastening portion 36*a* are in surface contact with each other by the first and second coupling surfaces 33*c* and 36*e*, slippage may not occur between the operating lever 36 and the main rod 33.

The lever 36*b* may be formed to extend from an outer circumferential surface of the fastening portion 36*a* in a vertical direction. The user may rotate the main rod 33 by holding the lever 36*b* and rotating the operating lever 36.

A fastening protrusion 36*d* may be formed on an upper surface of the fastening portion 36*a*. The fastening protrusion 36*d* may be formed to protrude upward a predetermined section of an upper surface of the fastening portion 36*a* by a predetermined height h1. The fastening protrusion 36*d* may be caught on a protrusion 37*b* of a plate 37 to move the operating lever 36 and the main rod 33 down.

A damper 34 may be fitted to the main rod 33. The damper 34 may be provided to be in contact with a bottom surface of the upper flange 31*a* of the base 31. In particular, in the damper 34, extensions 34*a* are formed to extend upward. The extensions 34*a* are formed at an interval of 180 degrees at the damper 34 and the main rod 33 so that the main rod 33 is positioned at a portion passing through the mounting hole 31*b*. In the mounting hole 31*b*, the extensions 34*a* may be inserted between the main rod 33 and the mounting hole 31*b*.

The extensions 34*a* may be spread outward by the rotation of the main rod 33. Since a cam 33*b*, which protrudes from a portion of a circumference below the head 33*a*, is formed on the main rod 33, when the main rod 33 is rotated, the cam 33*b* may press the extensions 34*a* outward. The cam 33*b* may be formed to press the extensions 34*a* in a state in which the main rod 33 restrains the upper module 11.

That is, in a state in which the main rod 33 does not restrain the upper module 11, the cam 33*b* may not press the extensions 34*a*, and a clearance C may be formed between the mounting hole 31*b* and the extensions 34*a*. However, when the main rod 33 is rotated to restrain the upper module 11, the cam 33*b* may press the extensions 34*a* outward so that the clearance C disappears. Since the extensions 34*a* are positioned between the mounting hole 31*b* and the cam 33*b*, movement of the main rod 33 in a direction parallel to the ground may be suppressed.

A spring 35 may be fitted to an outer circumference of the main rod 33. An upper end portion of the spring 35 may be supported on a bottom surface of the damper 34, and a lower end portion of the spring 35 may be supported on a washer 35*a* so that the spring 35 elastically supports the damper 34 and the main rod 33 upward. The washer 35*a* may be inserted into the through-hole 31*d* of the lower flange 31*c*.

The plate 37 may be fastened to a bottom surface of the lower flange 31*c*. A through-hole 37*a* may be formed in the plate 37 so that the main rod 33 passes through the through-hole 37*a*. A protrusion 37*b* may be formed to protrude downward from a portion of the plate 37 at a predetermined height h2.

The protrusion 37*b* may come into contact with the fastening protrusion 36*d* according to a rotation of the operating lever 36. Since the operating lever 36 is rotated and thus the fastening protrusion 36*d* comes into contact with the protrusion 37*b*, the operating lever 36 may be moved down at a predetermined height. When the height h1 of the fastening protrusion 36*d* and the height h2 of the protrusion 37*b* are the same, the operating lever 36 may be moved down as much as that height. Meanwhile, when the height h1 of the fastening protrusion 36*d* and the height h2 of the protrusion 37*b* are not the same, the operating lever 36 may be moved down as much as a lower one of the two heights.

A cap nut 38 may be fastened to a bottom surface of the plate 37. The lower end portion of the main rod 33 and the operating lever 36 may be fastened inside the cap nut 38. The cap nut 38 may be fastened to a lower end of the main rod 33. The cap nut 38 may restrain the lower end of the main rod 33 to prevent the main rod 33 from being pulled upward.

An operating state of the mounting unit 30 for an upper module of the vehicle according to embodiments of the present disclosure, which has the above-described configuration, will be described as follows.

FIGS. 4 to 6D show a process of mounting the upper module 11 using the mounting unit 30 for an upper module.

The mounting units 30 for an upper module may be provided at a plurality of points of the under body 12. In correspondence to the mounting units 30, the mounting brackets 21 may be provided on the lower surface of the upper module 11.

Figure 4:
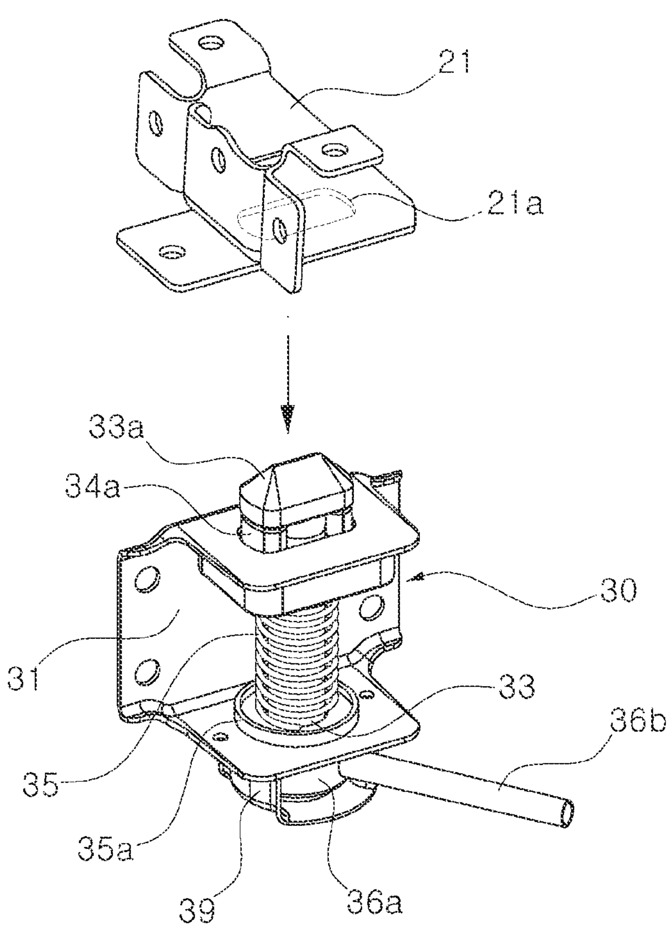
FIG. 4 is a perspective view illustrating a state in which a mounting bracket of the upper module is positioned above the mounting unit for the upper module of a vehicle according to embodiments of the present disclosure.

In order to mount the upper module 11 on the under body 12 of the vehicle, the upper module 11 may be aligned to position the mounting bracket 21 above the mounting unit 30 for an upper module (see FIG. 4).

When the upper module 11 is moved down in a state in which the upper module 11 is aligned with the under body 12, the head 33*a* may be inserted into the fixing hole 21*a* of the mounting bracket 21. In an unlocked state, since the fixing hole 21*a* and the head 33*a* are aligned in the same direction, the head 33*a* may pass through the fixing hole 21*a*. When the upper module 11 is continuously moved down, the lower surface of the mounting bracket 21 may be seated on the upper surface of the base 31. In this state, the head 33*a* may pass through the fixing hole 21*a*, and the damper 34 may be positioned in the fixing hole 21*a* (see FIGS. 5A and 5B).

Figure 5A:
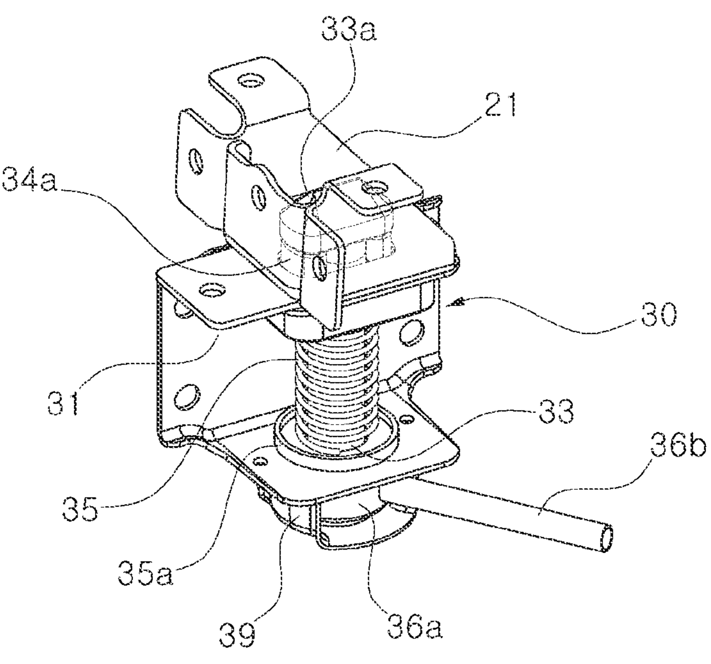
FIGS. 5A to 5C are a perspective view, a front view, and a plan view illustrating a state in which the mounting bracket of the upper module is seated on the mounting unit for the upper module of a vehicle according to embodiments of the present disclosure.
Figure 5B:
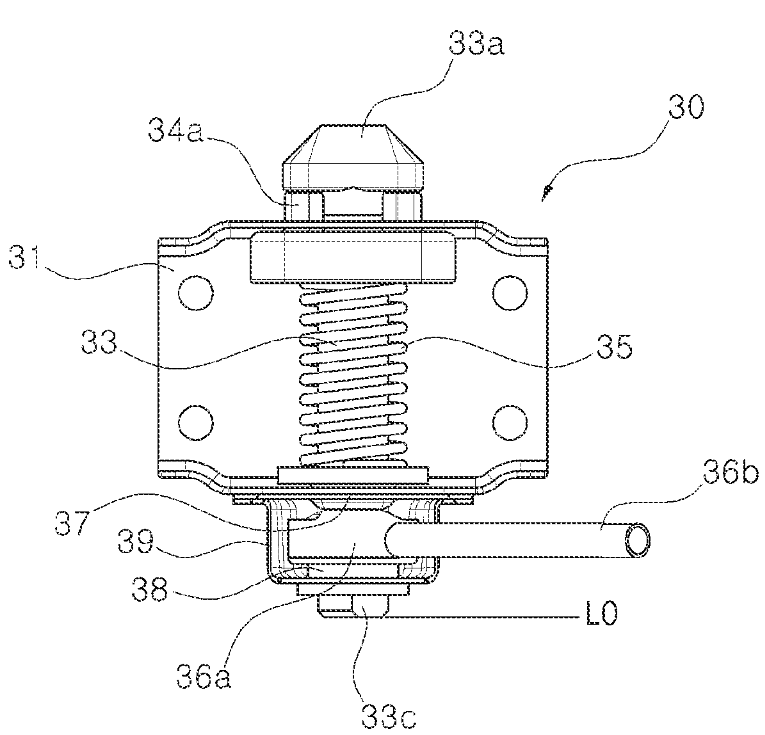
Figure 5C:
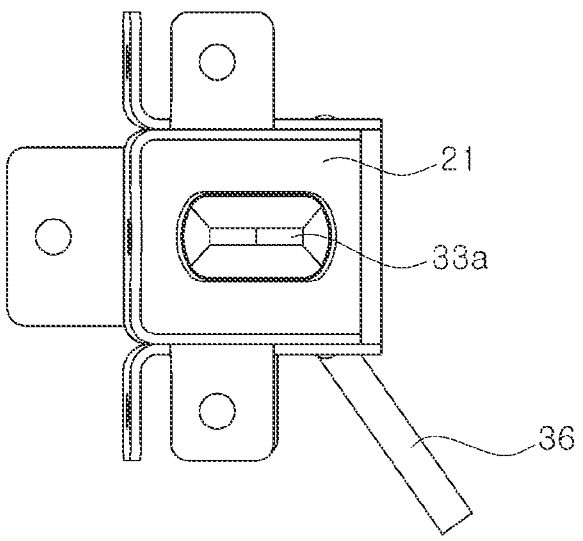
Figure 5D:
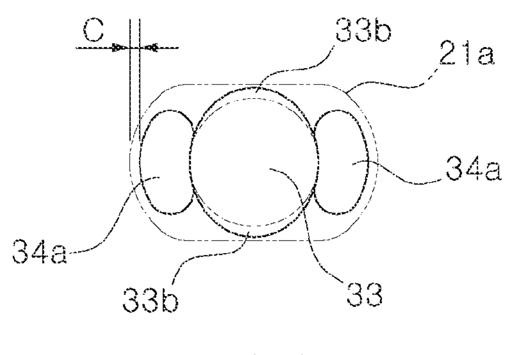
FIG. 5D is a schematic diagram illustrating a relationship between a cam and an extension in a state in which the upper module is seated on the mounting unit for the upper module of a vehicle according to embodiments of the present disclosure.

In this state, since the head 33*a* is aligned in the same direction as the fixing hole 21*a*, the mounting unit 30 for an upper module may be in an unlocked state, and the upper module 11 may not be fixed to the under body 12 (see FIG. 5C). In addition, since the cam 33*b* is in a state of not pressing the extension 34*a*, a clearance C may be present between the extension 34*a* and the fixing hole 21*a* so that the upper module 11 may move within a predetermined distance with respect to the under body 12 (see FIG. 5D).

Next, in a state in which the upper module 11 is seated on the base 31, the operating lever 36 may be rotated at a predetermined angle as shown in FIG. 5C to lock the upper module 11 with respect to the under body 12.

Figure 6A:
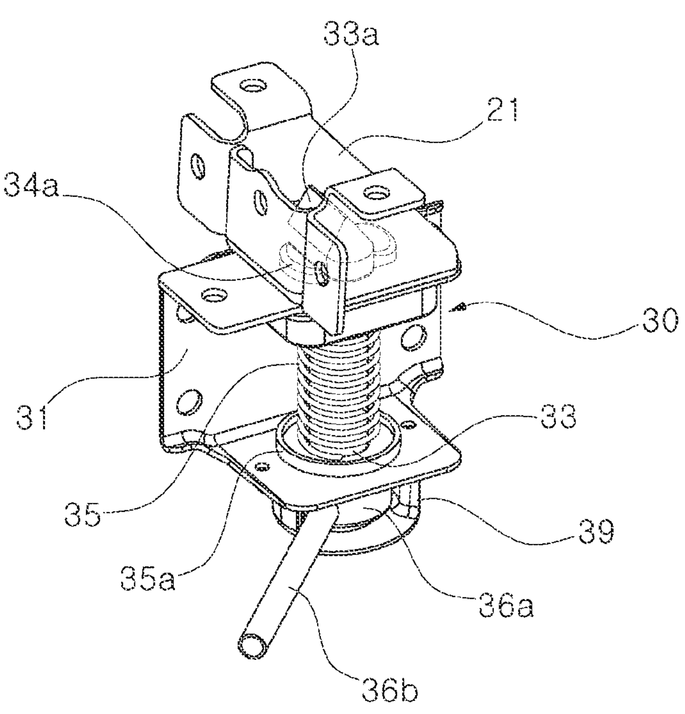
FIGS. 6A to 6C are a perspective view, a front view, and a plan view illustrating a state in which the mounting bracket of the upper module is locked to the mounting unit for the upper module of a vehicle according to embodiments of the present disclosure.
Figure 6B:
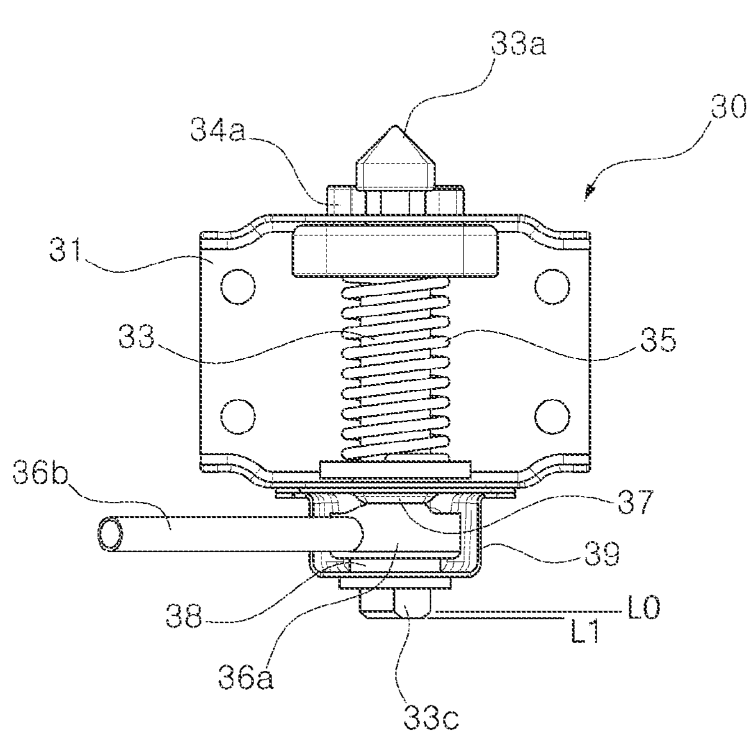
Figure 6C:
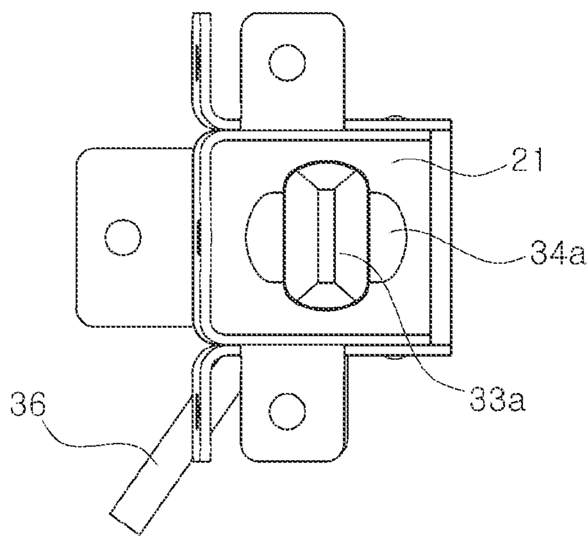
Figure 6D:
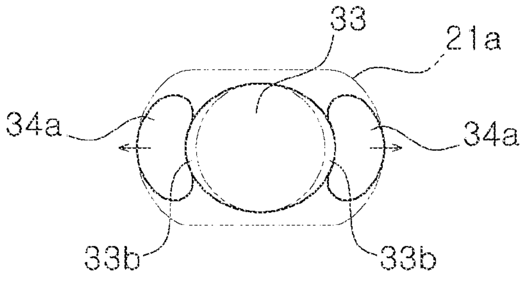
FIG. 6D is a schematic diagram illustrating a relationship between the cam and the extension in a state in which the upper module is locked to the mounting unit for the upper module of a vehicle according to embodiments of the present disclosure.

That is, when the operating lever 36 is rotated at an angle of about 90 degrees in a clockwise direction, the main rod 33 may be rotated, and the head 33*a* and the fixing hole 21*a* may be aligned in different directions, for example, at a right angle, so that the head 33*a* passes through the fixing hole 21*a* not to be moved downward anymore (see FIG. 6C). In this way, the head 33*a* may restrict the upward movement of the mounting bracket 21 so that the upper module 11 is locked with respect to the under body 12.

In particular, while the operating lever 36 is rotated, since the fastening protrusion 36*d* is in contact with the bottom surface of the protrusion 37*b*, the operating lever 36 may be moved down as much as the predetermined height h2. When the operating lever 36 is rotated, the fastening protrusion 36*d* may be rotated in a state of coming into contact with the protrusion 37*b*, and thus the operating lever 36 and the main rod 33 may be moved down. Until the operating lever 36 is rotated, the lower end portion of the main rod 33 may be positioned at L0 (see FIGS. 5B and 6B), and when the operating lever 36 is rotated, the main rod 33 may be moved down so that the lower end of the main rod 33 is positioned at L1 (see FIG. 6B).

Due to the downward movement of the operating lever 36, the main rod 33 also may be moved down, and the head 33*a* may press the mounting bracket 21 downward so that the clearance in a vertical direction is prevented in a state in which the upper module 11 is mounted.

In addition, since the cam 33*b* presses the extension 34*a* outward due to the rotation of the main rod 33, the clearance C between the extension 34*a* and the fixing hole 21*a* may disappear, and when the upper module 11 is mounted on the under body 12 while the extension 34*a* presses the inner surface of the fixing hole 21*a*, a clearance in a horizontal direction may be prevented.

Meanwhile, a process of separating the upper module 11 may be performed opposite to the process of mounting the upper module 11. That is, the user may rotate the operating lever 36 in a counterclockwise direction as shown in FIG. 6C to rotate the main rod 33 so that the head 33*a* and the fixing hole 21*a* of the mounting bracket 21 are aligned in the same direction. When the head 33*a* and the fixing hole 21*a* are aligned in the same direction (see FIG. 5C), the head 33*a* may pass through the fixing hole 21*a*, and thus the upper module 11 and the under body 12 may be unlocked, that is, may be in a separable state. In this state, when the upper module 11 is lifted from the under body 12, the upper module 11 may be separated from the vehicle.

As described above, by using the mounting unit 30 for an upper module according to embodiments of the present disclosure, various types of upper modules 11 may be easily mounted on or removed from the under body of the vehicle. Therefore, different shapes of the upper modules 11 may be alternately mounted on and used at the vehicle. Alternatively, by using a method of removing an empty loading bay and installing the loading bay loaded with cargo in advance, a time required for loading cargo at a distribution center may be reduced.

In accordance with a mounting unit for an upper module of a vehicle according to embodiments of the present disclosure, which has the above-described configuration, an upper module may be firmly mounted on a vehicle by simply operating an operating lever in a state in which the upper module is stationary on an upper part of an under body of the vehicle.

Therefore, various types of upper modules may be easily mounted on or removed from the under body of the vehicle.

In addition, when the operating lever is operated, a main rod may be moved down to press a mounting bracket on an upper module downward so that a binding force between the mounting bracket and a base may be increased.

While embodiments of the present disclosure have been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. A mounting device for an upper module of a vehicle, the mounting device comprising:

a base mounted on an under body of the vehicle;

a main rod rotatably disposed on the base and having a head configured to pass through a mounting bracket mounted on the upper module of the vehicle or to be caught and fixed by the mounting bracket according to a rotation of the main rod;

an operating lever having an end portion coupled to the main rod, the operating lever being configured to rotate the main rod to couple or separate the head to or from the mounting bracket, wherein, in a state in which the head is coupled to the mounting bracket, the operating lever is configured to move the main rod down at a predetermined height;

a plate coupled to a bottom surface of the base, wherein protrusions are formed on the plate at regular intervals to protrude downward at predetermined heights along a circumference; and a fastening protrusion disposed at the operating lever, wherein the fastening protrusion is configured to be caught on the protrusions to move the main rod down in the state in which the head is coupled to the mounting bracket.

2. The mounting device of claim 1, wherein the operating lever comprises:

a fastening portion coupled to the main rod, wherein the fastening portion has a fastening hole through which the main rod passes; and a lever vertically extending from an outer surface of the fastening portion, wherein a plurality of fastening protrusions is disposed at intervals along a circumference of an upper surface of the fastening portion.

3. The mounting device of claim 2, wherein:

a first coupling surface is disposed at a lower portion of the main rod, the first coupling surface being a flat surface;

a portion of the fastening hole of the operating lever is a second coupling surface corresponding to the first coupling surface; and a cap nut configured to fasten the operating lever to the main rod is screw-coupled to a lower end portion of the main rod.

4. The mounting device of claim 1, wherein:

an upper flange and a lower flange are disposed to extend from an upper end portion and a lower end portion of the base parallel to the ground, respectively; and the main rod is configured to pass through the upper flange and the lower flange.

5. The mounting device of claim 4, wherein the plate is disposed on a bottom surface of the lower flange.

6. A mounting device for an upper module of a vehicle, the mounting device comprising:

a base mounted on an under body of the vehicle;

a mounting bracket mounted on the upper module of the vehicle, wherein a fixing hole having a shape of an elongated hole is disposed in the mounting bracket;

a main rod rotatably disposed on the base and having a head disposed at an upper end portion of the main rod to have a cross section corresponding to the fixing hole, wherein the head is configured to pass through or be caught on the fixing hole according to a rotation of the main rod so that the upper module is unlocked or locked, respectively, with respect to the under body;

a damper configured to be inserted into the main rod and inserted and fixed between the main rod and the fixing hole while spread outward in a state in which the main rod is rotated; and an operating lever having an end portion coupled to the main rod, the operating lever being configured to rotate the main rod to couple or separate the head to or from the mounting bracket.

7. The mounting device of claim 6, further comprising:

extensions extending outward disposed on the damper at predetermined intervals; and a cam disposed on the main rod and protruding outward in a circumferential direction of the main rod, wherein, in the state in which the main rod is rotated, the cam is configured to press the extensions outward so that the extensions are inserted and fixed between the main rod and the fixing hole.

8. The mounting device of claim 7, wherein:

the extensions and the cam are disposed at an interval of 180 degrees on the damper and the main rod, respectively; and in a state in which the head and the fixing hole are aligned in different directions, the cam is configured to press the extensions so that the extensions spread outward.

9. The mounting device of claim 7, wherein the main rod comprises a spring configured to elastically support the main rod and the damper in an upward direction.

10. A vehicle comprising:

a vehicle body comprising an under body and an upper module configured to be mounted on the under body;

a mounting bracket mounted on the upper module, wherein a fixing hole having a shape of an elongated hole is disposed in the mounting bracket;

a base mounted on the under body;

an upper flange and a lower flange disposed to extend from an upper end portion and a lower end portion of the base parallel to the ground, respectively;

a main rod rotatably disposed on the base and having a head disposed at an upper end portion of the main rod to have a cross section corresponding to the fixing hole, wherein the head is configured to pass through or to be caught and fixed on the fixing hole of the mounting bracket according to a rotation of the main rod so that the upper module is unlocked or locked, respectively, with respect to the under body and wherein the main rod is configured to pass through the upper flange and the lower flange; and an operating lever having an end portion coupled to the main rod, the operating lever being configured to rotate the main rod to couple or separate the head of the main rod to or from the mounting bracket.

11. The vehicle of claim 10, wherein in a state in which the head is coupled to the mounting bracket, the operating lever is configured to move the main rod down at a predetermined height.

12. The vehicle of claim 11, further comprising:

a plate coupled to a bottom surface of the base, wherein protrusions are disposed on the plate at regular intervals to protrude downward at predetermined heights along a circumference; and a fastening protrusion disposed at the operating lever, wherein the fastening protrusion is configured to be caught on the protrusions of the plate to move the main rod down in the state in which the head is coupled to the mounting bracket.

13. The vehicle of claim 10, wherein the operating lever comprises:

a fastening portion coupled to the main rod, wherein the fastening portion comprises a fastening hole through which the main rod passes; and a lever vertically extending from an outer surface of the fastening portion, wherein fastening protrusions are formed at intervals along a circumference of an upper surface of the fastening portion.

14. The vehicle of claim 13, further comprising:

a first coupling surface disposed at a lower portion of the main rod, wherein the first coupling surface is a flat surface, and wherein a portion of the fastening hole is a second coupling surface corresponding to the first coupling surface; and a cap nut configured to fasten the operating lever to the main rod by being screw-coupled to a lower end portion of the main rod.

15. The vehicle of claim 10, further comprising a damper configured to be inserted into the main rod and inserted and fixed between the main rod and the fixing hole while spread outward in a state in which the main rod is rotated.

16. The vehicle of claim 15, wherein the main rod comprises a spring configured to elastically support the main rod and the damper in an upward direction.

17. The mounting device of claim 1, further comprising:

a fixing hole having a shape of an elongated hole disposed in the mounting bracket, wherein the head is disposed at an upper end portion of the main rod to have a cross section corresponding to the fixing hole; and a damper configured to be inserted into the main rod and inserted and fixed between the main rod and the fixing hole while spread outward in a state in which the main rod is rotated.

18. The mounting device of claim 17, further comprising:

extensions extending outward disposed on the damper at predetermined intervals; and a cam disposed on the main rod and protruding outward in a circumferential direction of the main rod, wherein, in the state in which the main rod is rotated, the cam is configured to press the extensions outward so that the extensions are inserted and fixed between the main rod and the fixing hole.

19. The mounting device of claim 18, wherein:

the extensions and the cam are disposed at an interval of 180 degrees on the damper and the main rod, respectively; and in a state in which the head and the fixing hole are aligned in different directions, the cam is configured to press the extensions so that the extensions spread outward.

20. The mounting device of claim 18, wherein the main rod comprises a spring configured to elastically support the main rod and the damper in an upward direction.

* * * * *